US008750120B2

(12) United States Patent
DeVilbiss et al.

(10) Patent No.: US 8,750,120 B2
(45) Date of Patent: Jun. 10, 2014

(54) CONFIRMED DELIVERY OF BRIDGED UNICAST FRAMES

(75) Inventors: Colin R. DeVilbiss, Rochester, MN (US); Scott T. Robinson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 13/281,616

(22) Filed: Oct. 26, 2011

(65) Prior Publication Data

US 2013/0107710 A1 May 2, 2013

(51) Int. Cl.
*H04L 12/26* (2006.01)

(52) U.S. Cl.
USPC ........................................ 370/235; 704/270.1

(58) Field of Classification Search
USPC ........... 370/235, 401, 351; 455/450; 719/313; 709/223; 726/4
See application file for complete search history.

(56) References Cited

U.S. PATENT DOCUMENTS

| | | | |
|---|---|---|---|
| 5,581,558 A | 12/1996 | Horney, II et al. | |
| 5,982,775 A | 11/1999 | Brunner et al. | |
| 6,553,028 B1 | 4/2003 | Tang et al. | |
| 7,389,359 B2 | 6/2008 | Jain et al. | |
| 7,929,554 B2 | 4/2011 | Sajassi et al. | |
| 7,983,262 B1 | 7/2011 | Bishara | |
| 7,990,965 B1 | 8/2011 | Aggarwal et al. | |
| 2002/0143951 A1 | 10/2002 | Khan et al. | |
| 2006/0083254 A1 | 4/2006 | Ge et al. | |
| 2007/0067432 A1* | 3/2007 | Tarui et al. | 709/223 |
| 2009/0183173 A1* | 7/2009 | Becker et al. | 719/313 |
| 2009/0185551 A1* | 7/2009 | Winter | 370/351 |
| 2010/0087199 A1* | 4/2010 | Chowdhary et al. | 455/450 |
| 2012/0044944 A1* | 2/2012 | Kotha et al. | 370/401 |
| 2012/0233668 A1* | 9/2012 | Leafe et al. | 726/4 |

FOREIGN PATENT DOCUMENTS

| | | |
|---|---|---|
| EP | 2252015 A1 | 11/2010 |
| WO | WO 2010 139115 A1 | 12/2010 |

OTHER PUBLICATIONS

Web Services Reliable Messaging (WS-ReliableMessaging) Version 1.2, Feb. 2, 2009, pp. 10-16.*
Li et al., "Multicast Cloud with Integrated Multicast and Unicast Content Distribution Routing," Cisco Systems Inc., retrieved from the Internet, http://2003.iwcw.org/papers/li.pdf, 2003 (6 pgs).
DiNicolo, "Switching and Bridging," May 5, 2004, http://archive.networknewz.com/2004/0505.html.

* cited by examiner

*Primary Examiner* — Wei Zhao
*Assistant Examiner* — Lionel Preval
(74) *Attorney, Agent, or Firm* — Toler Law Group

(57) ABSTRACT

Systems and methods to reduce table lookups and network traffic are provided. A bridging device may receive a unicast frame to be bridged. The unicast frame may be transmitted to at least one network of a plurality of networks. The bridging device may determine if the unicast frame was successfully delivered to the at least one network.

12 Claims, 4 Drawing Sheets

CONFIRMED DELIVERY OF BRIDGED UNICAST FRAMES

I. FIELD OF THE DISCLOSURE

Embodiments of the disclosure relate to computing systems, and more particularly, to routing Ethernet frames between networked computing devices.

II. BACKGROUND

A unicast frame is bridged to a single recipient device in a packet-switched computer network. A Media Access Control (MAC) address of the recipient device is typically stored within an address table that has been populated using a broadcast flooding operation. The address table is maintained at a bridging device that is coupled to the networks. Where the MAC address of the recipient device cannot be located in the address table, the unicast frame is forwarded to all of the bridged networks.

Maintaining the address table can burden the processing and storage resources of the bridging device. Additionally, not all networked device addresses may be stored in the address table. For instance, a MAC address is not stored for a port that has not generated traffic on the bridging device. In such a case, the bridging device applies pressure on all networks by transmitting the unicast frames to every network. Moreover, MAC addresses stored in the address table can become outdated. For example, a port may be moved to a new network, causing the bridging device to forward the unicast frame to the wrong recipient device.

III. SUMMARY OF THE DISCLOSURE

According to a particular embodiment, a method to reduce table lookups and network traffic when bridging networks includes receiving, at a bridging device, a unicast frame to be bridged. The unicast frame may be transmitted to at least one network of a plurality of networks. The method may further include determining, at the bridging device, if the unicast frame was successfully delivered to the at least one network.

According to another particular embodiment, an apparatus includes a plurality of networks and a bridging device. The bridging device may be configured to receive a unicast frame and to transmit the unicast frame to at least one network of the plurality of networks. The bridging device may further be configured to determine if the unicast frame was successfully delivered to the at least one network.

According to another particular embodiment, a program product may include program code executable to receive a unicast frame to be bridged at a bridging device and to transmit the unicast frame to at least one network of a plurality of networks. The program code may be executed to determine if the unicast frame was successfully delivered to the at least one network. The program product may further include a tangible computer readable medium bearing the program code.

Embodiments of the bridging device may reduce table lookups and network traffic. For example, the bridging device may route unicast frames without utilizing or maintaining an address table. By not retransmitting a unicast frame after it has been successfully delivered, network traffic and processing may be reduced, thereby facilitating improved routing efficiency. Moreover, the bridging device may reduce the number of table updates, while increasing storage and processor utilization. Where a hypervisor comprises a confirmed delivery network with synchronous confirmed delivery, common processor and memory resources may be used to verify delivery of the unicast frame to logical partitions.

These and other advantages and features that characterize embodiments are set forth in the claims annexed hereto and forming a further part hereof. However, for a better understanding of the embodiments, and of the advantages and objectives attained through their uses, reference should be made to the drawings and to the accompanying descriptive matter in which illustrative embodiments are described.

IV. BRIEF DESCRIPTION OF THE DRAWINGS

Figure 3:
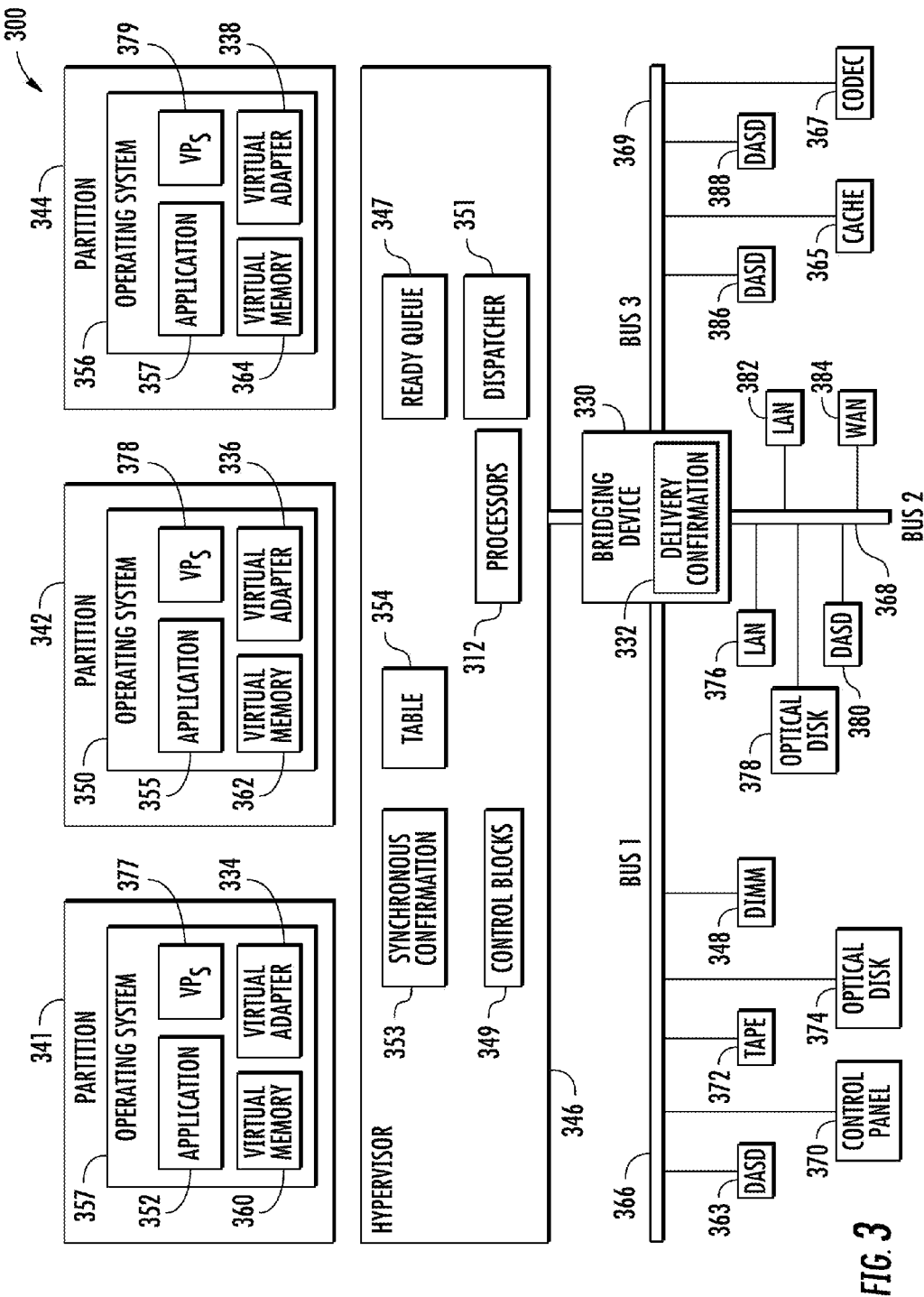
Figure 4:
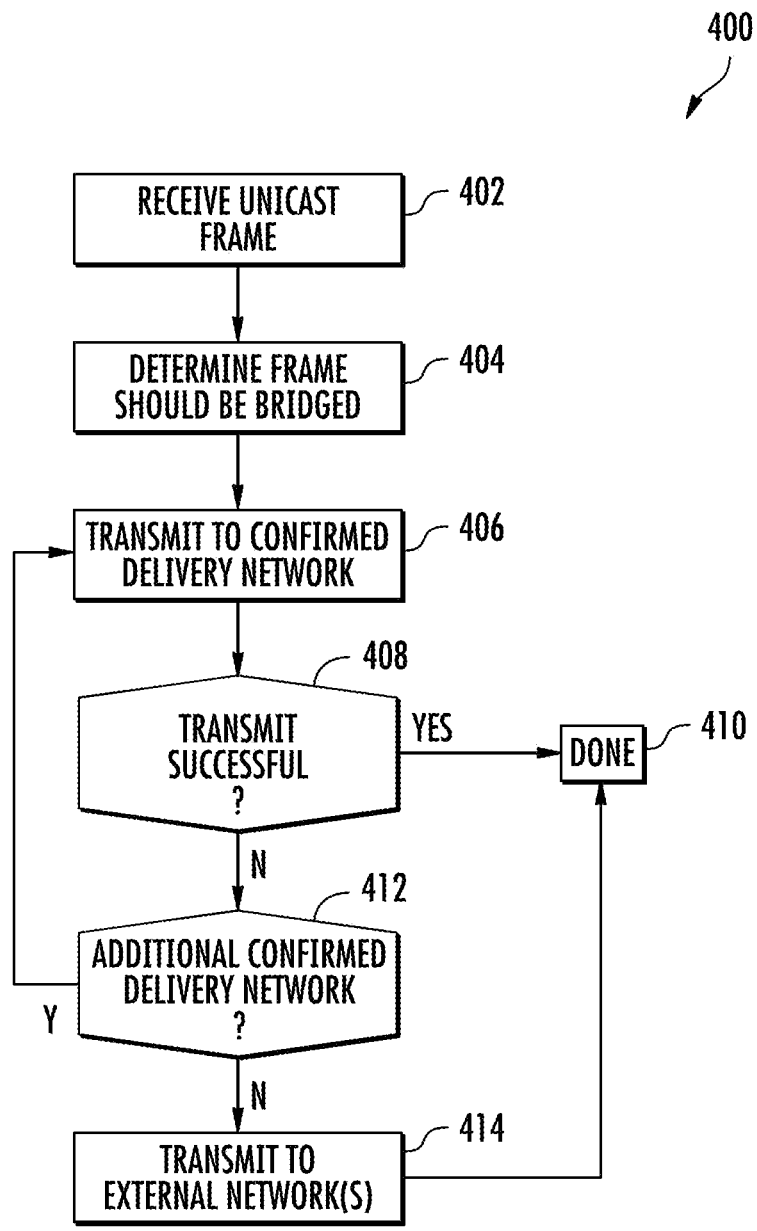

FIG. 3 is block diagram of a networked computing system having a hypervisor comprising a confirmed delivery network and a bridging device configured to determine whether a unicast frame is successfully delivered to a destination address associated with a logical partition; and FIG. 4 is flowchart of a particular embodiment of a method of routing a unicast frame using a networked bridging element configured to route the unicast frame based on at least one of a successful delivery indication from a confirmed delivery network and a network configuration consideration.

V. DETAILED DESCRIPTION

A particular embodiment includes a bridging device that does not retransmit a unicast frame when a delivery of the unicast frame to a confirmed delivery network is successful. The bridging device may submit the unicast frame, in turn, to each of a plurality of confirmed delivery networks. In response to the confirmed delivery network indicating a successful delivery of the unicast frame, the bridging device may stop transmission of the unicast frame. The transmission may be halted because no more than one port on a combined network has a given MAC address. An embodiment of a bridging device may preserve and exceed advantages of a per-network address table without additional processing and storage in the bridging device. Moreover, the bridging device may reduce the number of table lookups and updates, while facilitating improved storage and processor utilization.

An embodiment of the confirmed delivery network may provide efficient, synchronous confirmed delivery of unicast frames. The confirmed delivery network may possess knowledge of what ports are active on the network at any given time. If a destination of a unicast frame is present, then successful delivery of the unicast frame may be synchronously confirmed. Alternatively, a substantially immediate notification of a failure may be generated by the confirmed delivery network. The confirmation of a successful or an unsuccessful delivery may be substantially synchronous with the delivery of the unicast frame. For example, a confirmed delivery signal may be transmitted to the bridging device substantially immediately in response to determining the success or the failure of the delivery at the confirmed delivery network. The bridging device may thus offload address tracking processes to the confirmed delivery network.

An embodiment of an apparatus includes a bridging device coupled to multiple networks. At least one of the networks may include a confirmed delivery network configured to generate a confirmed delivery signal indicative of the success or failure of a unicast frame delivery operation. More particularly, a unicast frame may be received at the bridging device. The bridging device may determine whether the unicast frame is a candidate for bridging. The determination may be based on a networked configuration of the bridging device relative to at least one of the source of the unicast frame and a connected network. For instance, a unicast frame received from a host device may be a likely candidate for bridging because a destination could include multiple bridged networks, and therefore, could benefit from synchronous confirmed delivery bridging techniques. The determination may additionally be based on the type of received Ethernet frame. For example, frames received by the bridge that are not unicast frames could include Ethernet frames that are responses to an earlier frame. Another frame type could include broadcast frames that are transmitted to locate other hosts.

Should the unicast frame be a candidate for bridging, the bridging device may submit the unicast frame to the confirmed delivery network. Where the bridging device receives confirmation of frame delivery success, the unicast frame may not be retransmitted to another network. Otherwise, the bridging device may forward the unicast frame to another confirmed delivery network. Should none of the synchronous confirmed delivery networks be the destination, the unicast frame may be forwarded to networks other than the confirmed delivery networks. Additional forwarding of the unicast frame may not include transmission of the unicast frame to the (already attempted) confirmed delivery networks. Because a unicast frame (not received by the confirmed delivery network) is automatically delivered to the other (non-confirmed delivery) network, an address table may not be used.

According to a particular embodiment, the confirmed delivery network may be a power hypervisor (PHYP) having synchronous confirmed delivery. Efficiencies may be realized by using the same processor and memory resources to verify delivery of the unicast frame. Each unicast frame transmission may include looking up a MAC address in an in-memory table of guaranteed accuracy. Where the MAC address is present, the unicast frame may be copied into a buffer.

An embodiment of the bridging device may merge Ethernet networks together by forwarding frames from one to another network. The bridging device may be coupled to one or more networks having a synchronous confirmed delivery capability. The confirmed delivery networks may reduce or eliminate a need to maintain an address table at the bridging device. The address table would otherwise be needed to determine what address should be used for outgoing unicast frames. Instead, the bridging device may receive a confirmed delivery signal from a confirmed delivery network. Because the unicast frame only has one destination, the unicast frame may not be sent to another network. Where no confirmation is received (e.g., the confirmed delivery signal indicated delivery was unsuccessful), the unicast frame may be forwarded to another network, such as another confirmed delivery network. Where all of the networked synchronous confirmed delivery networks have been attempted, the bridging device may forward the unicast frame to a non-confirmed delivery network.

Figure 1:
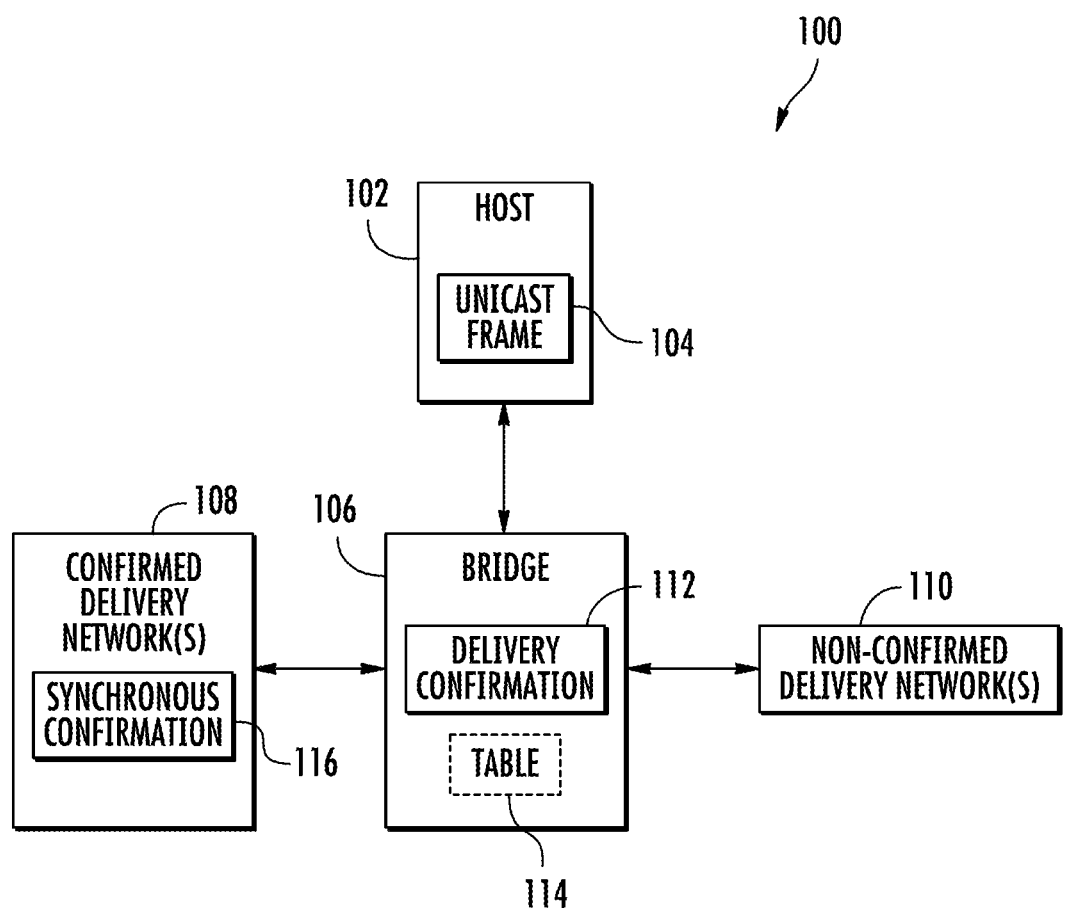
FIG. 1 is a block diagram of a networked computing system configured to reduce table lookups and network traffic by using a bridging device to determine whether a unicast frame has been successfully delivered to a destination address at a confirmed delivery network.

Turning more particularly to the drawings, FIG. 1 is a block diagram of an embodiment of an apparatus 100 that includes a host computing device, or host 102, configured to transmit a unicast frame 104 to a bridging device, or bridge 106. The unicast frame 104 may include a message having a unique address associated with a single network destination. The bridge 106 may be coupled to one or more confirmed delivery networks 108 and to one or more non-confirmed delivery networks 110.

The bridge 106 may execute a delivery confirmation algorithm 112 to determine if the received unicast frame 104 is an appropriate candidate with which to perform a delivery confirmation operation. For example, the bridge 106 may determine whether the unicast frame 104 was received from a device that is likely to send a frame to one or more confirmed delivery networks 108. More particularly, the bridge 106 may recognize that the host 102 could address the unicast frame 104 to either one of the confirmed delivery networks 108 or one of the unconfirmed delivery networks 110. The bridge 106 may additionally base the determination on other aspects of the network configuration, such as on a determination that the bridge 106 is in communication with the confirmed delivery networks 108.

The bridge 106 may transmit the received unicast frame 104 to one or more of the confirmed delivery networks 108. More specifically, the bridge 106 may route the unicast frame 104 to a first of the confirmed delivery networks 108. Each confirmed delivery network 108 may include a synchronous confirmation algorithm 116. The synchronous confirmation algorithm 116 may be executed to determine if a received unicast frame is deliverable to a destination within the confirmed delivery network 108.

A confirmed delivery signal may be generated at the confirmed delivery network and may be sent back to the transmitting device (e.g., the bridge 106). The confirmed delivery signal may indicate whether the unicast frame was either successfully or unsuccessfully received at a destination within the confirmed delivery network 108. Where the confirmed delivery signal indicates that the transmission is successful, the bridge 106 may not retransmit the unicast frame 104. Where the confirmed delivery signal alternatively indicates that the unicast frame 104 is not successfully delivered to a destination in the confirmed delivery network 108, the bridge 106 may transmit the unicast frame 104 to another of the confirmed delivery networks 108. The bridge 106 may in this manner sequentially attempt delivery to each of the confirmed delivery networks 108. Where delivery of the unicast frame 104 cannot be confirmed at any of the confirmed delivery networks 108, the bridge 106 may transmit the unicast frame 104 to the non-confirmed delivery networks 110.

Delivery of the unicast frame 104 may be accomplished by the bridge 106 without using an address table 114. That is, the address table 114 may not be used to lookup the address associated with the unicast frame 104. The address table 114 is shown in dashed outline in FIG. 1 to denote that an embodiment of the bridging device 106 may not include the address table 114. Another embodiment of the apparatus 100 may nonetheless include the address table 114 for use when the delivery confirmation processes are not used.

The bridge 106 may thus route the unicast frame 104 to one of the delivery networks 108, 110 without utilizing or maintaining the address table 114. The bridge 106 may determine whether to retransmit the unicast frame 104 based on a confirmed delivery signal from a confirmed delivery network 108. By determining if delivery to a destination address has succeeded or failed at the confirmed delivery network 108, the apparatus 100 may reduce network traffic and processing, thereby facilitating routing efficiency.

Figure 2:
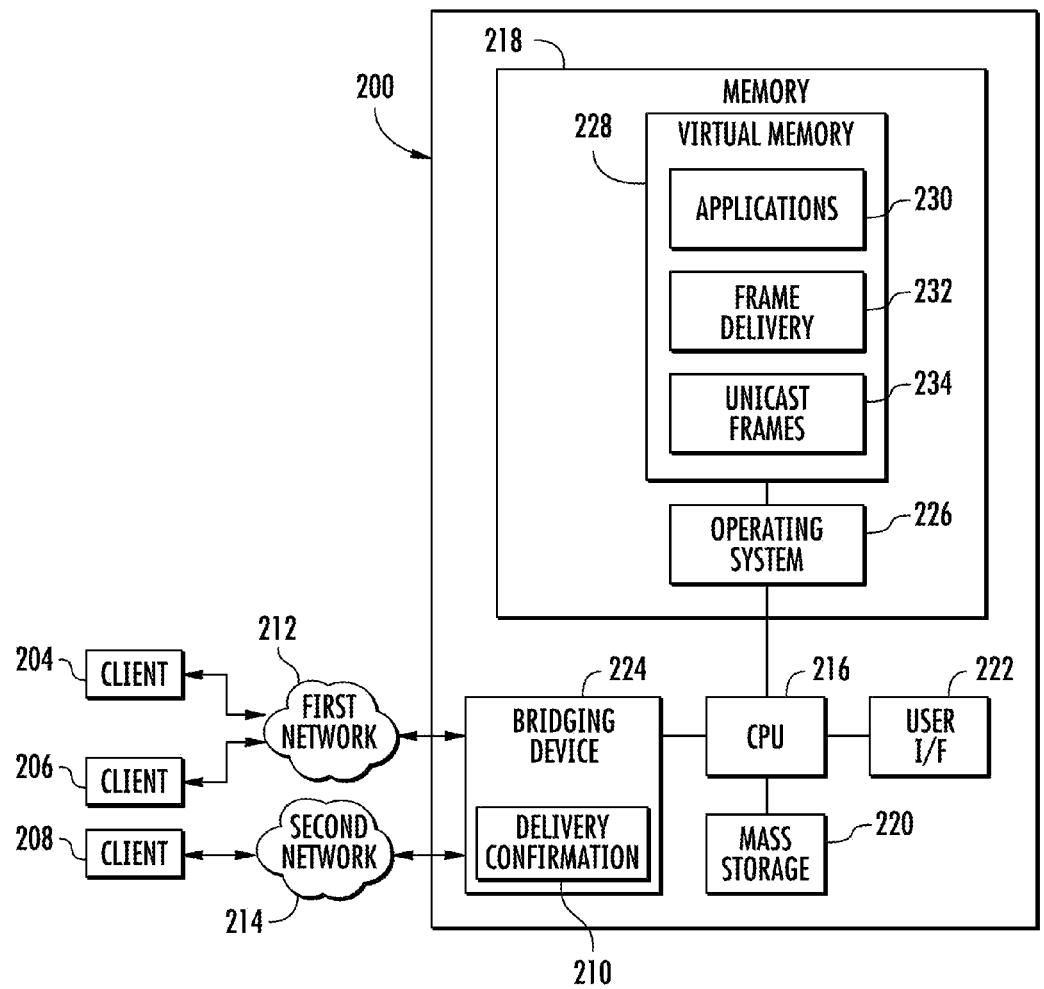
FIG. 2 is block diagram of a networked computing system having a bridging device included within a host device and configured to determine whether to route a unicast frame based on at least one of whether the unicast frame was successfully delivered to a destination address at a confirmed delivery network and a network configuration consideration.

FIG. 2 illustrates an embodiment of an apparatus, or computer system 200, which includes a bridging device 224. The bridging device 224 may transmit a unicast frame to a first network 212 (e.g., a confirmed delivery network) and determine a delivery status prior to retransmitting the unicast frame to a second network 214. The computer system 200 may be implemented as a server or as multi-user computer system that is coupled via a first network 212 and a second network 214 to client computers 204, 206, and 208. For the purposes of the illustrated embodiment, each computer 200, 204, 206, and 208 may represent practically any type of computer, computer system or other programmable electronic device. Moreover, each computer 200, 204, 206, and 208 may be implemented using one or more networked computers, e.g., in a cluster or other distributed computing system. In the alternative, each computer 200, 204, 206, and 208 may be implemented within a single computer or other programmable electronic device, such as a desktop computer, a laptop computer, a handheld computer, a cell phone, a set top box, a non-networked, standalone configuration, etc.

The computer 200 typically comprises a central processing unit (CPU) 216 that includes at least one microprocessor coupled to a memory 218. The memory 218 may represent random access memory (RAM) devices comprising the main storage of the computer system 200, as well as any supplemental levels of memory: cache memories, non-volatile or backup memories (programmable or flash memories), read-only memories, etc. In addition, the memory 218 may be considered to include memory storage physically located elsewhere in the computer system 200, e.g., any cache memory in a processor in the CPU 216, as well as any storage capacity used as a virtual memory, as stored on a mass storage device 220 or on another computer coupled to the computer system 200.

In a runtime environment, the memory 218 may include a virtual memory 228 that includes applications 230 and other program code executed by the CPU 216 to perform various functions. For example, the virtual memory 228 may include a frame delivery module 232 that is executed to transmit unicast frames 234 to the bridging device 224.

The bridging device 224 may include a delivery confirmation module 210. The bridging device 224 may execute the delivery confirmation module 210 when transmitting a unicast frame to a confirmed delivery network. The bridging device 224 may determine if the unicast frame was successfully or unsuccessfully delivered prior to transmitting the unicast frame to another delivery network.

The computer system 200 typically receives a number of inputs and outputs for communicating information externally. For interface with a user or operator, the computer system 200 typically includes a user interface 222 incorporating one or more user input devices (e.g., a keyboard, a mouse, a trackball, a joystick, a touchpad, and/or a microphone, etc.) and a display (e.g., a CRT monitor, an LCD display panel, and/or a speaker, etc.) Otherwise, user input may be received via another computer or terminal.

For additional storage, the computer system 200 may also include one or more mass storage devices 220, such as a floppy or other removable disk drive, a hard disk drive, a direct access storage device (DASD), an optical drive (a CD drive, a DVD drive, etc.), and/or a tape drive, among others.

Furthermore, the computer system 200 may include the bridging device 224. The bridging device 224 may be in communication with the first and second networks 212, 214 (e.g., a LAN, a WAN, a wireless network, and/or the Internet, and so on) to permit the communication of information with other computers and electronic devices. The first network 212 may include a confirmed delivery network, and the second network 212 may include a non-confirmed delivery network.

The computer system 200 may operate under the control of an operating system 226 and executes or otherwise relies upon various computer software applications, components, programs, objects, modules, data structures, etc., as will be described in greater detail below. Moreover, various applications, components, programs, objects, modules, etc. may also execute on one or more processors in another computer coupled to the computer system 200 via one or more of the first and second networks 212, 214, e.g., in a distributed or client-server computing environment, whereby the processing required to implement the functions of a computer program may be allocated to multiple computers over a network.

It should be appreciated that the computer system 200 typically includes suitable analog or digital interfaces between the CPU 216 and each of components 216, 218, 220, 222, 224, 226, 228 as is well known in the art. Other hardware and software environments are contemplated within the context of the invention.

In general, the routines executed to implement the embodiments, whether implemented as part of the operating system 226 or a specific application 230, component, program, object, module or sequence of instructions, or even a subset thereof, will be referred to herein as "algorithms," "module," "program code," or simply "programs." Program code typically comprises one or more instructions that are resident at various times in various memory and storage devices in a computer. When read and executed by one or more processors in a computer, the instructions may cause that computer to perform the steps necessary to execute steps or elements embodying the various aspects of an embodiment.

Moreover, while embodiments have and hereinafter will be described in the context of fully functioning computers and computer systems, those skilled in the art will appreciate that the various embodiments are capable of being distributed as a program product in a variety of forms, and that embodiments are not limited to a particular type of computer readable media used to actually carry out the distribution. Examples of computer readable media comprise, but are not limited to tangible, non-transitory, recordable type media and transmission type media. Examples of tangible, recordable type media include volatile and non-volatile memory devices, floppy and other removable disks, hard disk drives, magnetic tape, and optical disks (CD-ROMs, DVDs, etc.). Examples of transmission type media include digital and analog communication links.

In addition, various program code described hereinafter may be identified based upon the application within which it is implemented in a specific embodiment. However, it should be appreciated that any particular program nomenclature is used merely for convenience, and thus embodiments should not be limited to use solely in any specific application identified and/or implied by such nomenclature.

FIG. 3 shows an embodiment of an apparatus 300 having a power hypervisor, or hypervisor 346, which comprises a confirmed delivery network with synchronous confirmed delivery. Efficiencies may be realized by using the same processor and memory resources to verify delivery of a unicast frame. The hypervisor 346 may include a base level function that manages common system resources, such as memory and processors. An embodiment may enable unicast frame delivery in the hypervisor 346.

A virtual Ethernet network may be shared between a plurality of logical partitions 341, 342, 344, and a user may configure participation for each partition. When a partition 341, 342, 344 initiates participation, the logical partition 341, 342, 344 may have a virtual Ethernet adapter that has been assigned a destination MAC address. Unicast frames may be addressed to the virtual Ethernet adapters 334, 336, 338 using the assigned MAC addresses. The hypervisor 346 may enroll the MAC address in an in-memory table 354. When a virtual Ethernet adapter 334, 336, 338 transmits a unicast frame, the in-memory table 354 may be used to locate a destination address for that unicast frame. If the destination address is present, the unicast frame may be copied from a source partition virtual memory 360 into a destination partition virtual memory 362. This copying may be accomplished in a protected manner through operation of a device driver on either side. Where the destination address is absent, a synchronous return code may be received that indicates the absence of a destination logical partition 342. The source partition 341 may act upon the indication of non-delivery by sending the unicast frame to another destination address.

In one respect, FIG. 3 may illustrate in greater detail the primary software components and resources used to implement a logically partitioned environment consistent with the computer system 200 of FIG. 2. FIG. 3 generally shows a computing architecture characterized as a virtual machine design developed by International Business Machines (IBM). The computer system 300 includes the logical partitions 341, 342, 344 that share common processing resources among multiple processes. An embodiment of the system 300 may include a single computing machine having one or more processors 312. The processors 312 may execute software configured to simulate multiple virtual processors 377, 378, and 379.

The logical partitions 341, 342, 344 may logically comprise a portion of the processors 312, DASD 364, and other resources as assigned by an administrator. Each logical partition 341, 342, 344 typically hosts an operating system 350, 356, 357 and may have multiple virtual processors 377, 378, and 379. In this manner, each logical partition 341, 342, 344 may operate largely as a separate computer. As shown in FIG. 3, the production environment comprising each logical partition 341, 342, 344 may also include program code, such as the applications 352, 355, and 357.

The hypervisor 346, or partition manager, may use this scheme to assign physical resources to each logical partition 341, 342, and 344. In virtualization technology, the hypervisor 346 may manage the operating systems 350, 356, 357 (or multiple instances of the same operating system) on a single computer system. The hypervisor 346 may allocate and otherwise manage the processor, memory, and other resources. For instance, the hypervisor 346 may intercept requests for resources from operating systems 350, 356, 357 to globally share and distribute resources. Where the logical partitions 341, 342, 344 are sharing a processor 312, the hypervisor 346 may allocate processor cycles between the virtual processors 377, 378, 379 of the logical partitions 341, 342, and 344.

In the context of unicast frame routing, the hypervisor 346 may include a synchronous confirmation module 353. The hypervisor 346 may use the synchronous confirmation module 353 to confirm delivery of a unicast frame. A table 354 including MAC addresses may additionally be used to match an address of a destination of the unicast frame. Where the destination address of the unicast frame is determined to be in the network comprising the hypervisor 346, a confirmed delivery signal may be sent to a bridging device 330. The bridging device 330 may be configured to transmit the unicast frame to the hypervisor 346 (e.g., comprising a confirmed delivery network). The bridging device 330 may additionally determine whether the unicast frame was successfully delivered based on the received confirmed delivery signal, prior to transmitting the unicast frame to another delivery network. For instance, the bridging device 330 may route the unicast frame to a local area network (LAN) 382 or a wide area network (WAN) 384 not having delivery confirmation capabilities.

Each operating system 350, 356, 357 may control the primary operations of its respective logical partition 341, 342, 344 in the same manner as the operating system of a non-partitioned computer. Each logical partition 341, 342, 344 may execute in a separate memory space, represented by virtual memory 360, 362, and 364. Moreover, each logical partition 341, 342, 344 may be statically and dynamically allocated to a portion of the available resources in computer system 300. For example, each logical partition 341, 342, 344 may share one or more of the processors 312, as well as a portion of the available memory space for use in the virtual memory 360, 362, and 364. In this manner, a given processor 312 may be utilized by more than one logical partition 341, 342, 344.

The hypervisor 346 may include a dispatcher 351 that manages the dispatching of the virtual processors 377, 378, 379 to the processors 312 on a dispatch list, or ready queue 347. The ready queue 347 comprises memory that includes a list of virtual processors 377, 378, 379 having work that is waiting to be dispatched on the processor 312. Processor control blocks 349 of the hypervisor 346 comprise memory that includes a list of the virtual processors 377, 378, 379 waiting for access on a particular processor 312. One skilled in the art will appreciate that other embodiments may be realized by executing the above programs in an operating system 350, 356, 357, as opposed to in the hypervisor 346.

Additional resources, e.g., mass storage, backup storage, user input, network connections, and the like, are typically allocated to one or more logical partitions 341, 342, 344 in a manner well known in the art. Resources may be allocated in a number of manners, e.g., on a bus-by-bus basis, or on a resource-by-resource basis, with multiple logical partitions sharing resources on the same bus. Some resources may be concurrently allocated to multiple logical partitions 341, 342, and 344. FIG. 2 illustrates, for example, three logical buses 366, 368, 369, with a plurality of resources on bus 366 that include a DASD 364, a control panel 370, a tape drive 372, and an optical disk drive 374. The bus 368 may alternatively have resources allocated on a resource-by-resource basis, e.g., with a LAN adaptor 376, an optical disk drive 378, and a DASD 380 allocated to the logical partition 342, and the LAN 382 and the WAN 384 allocated to the logical partition 344. The bus 369 may represent, for example, a bus allocated specifically to the logical partition 344, such that all resources on the bus, e.g., DASDs 386, 388, are allocated to the same logical partition 344. The hardware shown in FIG. 3 optionally comprises one or more caches 365, a compression/decompression engine (CODEC) 367 and DIMMs 348.

FIG. 3 thus shows an embodiment where the hypervisor 346 comprises a confirmed delivery network with synchronous confirmed delivery. For efficiency considerations, common processor and memory resources may be used to verify delivery of the unicast frame to the logical partitions 341, 342, and 344. Unicast frames may be addressed to the virtual Ethernet adapters 334, 336, 338 using the assigned MAC addresses. An in-memory table 354 may be used to locate a destination address for a unicast frame. If the destination address is present, the unicast frame may be copied from a source partition virtual memory 360 into a destination partition virtual memory 362. In this manner, the embodiment may enable unicast frame delivery in the hypervisor 346.

The flowchart of FIG. 4 illustrates an embodiment of a method 400 of routing a unicast frame at a bridging device to a confirmed delivery network. The method 400 may include determining if the unicast frame was successfully or unsuccessfully delivered. The confirmation of the successful delivery may prevent unnecessary retransmission of the unicast frame to another delivery network.

Turning more particularly to the flowchart, a unicast frame at 402 may be received at a bridging device. For example, the unicast frame 104 of FIG. 1 may be received at the bridging device 106 from the host device 102. The unicast frame 104 may be addressed to a destination associated with one of the confirmed delivery networks 108 or the non-confirmed delivery networks 110.

At 404, the method 400 may determine if the unicast frame should be bridged. For instance, the bridging device 106 of FIG. 1 may determine if the unicast frame 104 should be bridged based on at least one of the type of frame (e.g., a unicast frame or a broadcast frame), an origin of the unicast frame 104, a potential destination of the unicast frame 104 (e.g., a confirmed delivery network 108 or a non-confirmed delivery network 110), and a network configuration consideration (e.g., the relative positioning of the source device with respect to the bridging device and potential destination devices).

The unicast frame may be initially routed at 406 to a confirmed delivery network. For example, the bridging device 106 of FIG. 1 may transmit the unicast frame 104 to the first confirmed delivery network 108. The unicast frame 104 may thus be routed by the bridging device 106 without use of the MAC address table 114.

At 408, the method 400 may determine if the transmission of the unicast frame was successful or unsuccessful. For example, the bridging device 106 of FIG. 1 may determine if the unicast frame 104 was successfully delivered to a destination at the first confirmed delivery network 108. The bridging device 106 may make such a determination in response to receiving a confirmed delivery signal from the confirmed delivery network 108.

Where the transmission is successful at 408, no further action may be needed, and the method 400 may complete at 410. For instance, the bridging device 106 of FIG. 1 may prevent transmission of the unicast frame 104 to another network. By not sending the unicast frame 104 to other networks, total network traffic and associated processing may be reduced.

Where the frame transmission is alternatively unsuccessful at 408, the method 400 may determine at 412 whether there is an additional confirmed delivery network. For example, the bridging device 106 of FIG. 1 may determine that another confirmed delivery network 108 is connected to a port of the bridging device 106. In response, the bridging device 106 may retransmit at 406 the unicast frame 104 to the second, additional confirmed delivery network 108.

Where delivery to all of the confirmed delivery networks 108 has been attempted and has failed, the method 400 may transmit the unicast frame 104 to non-confirmed delivery networks 110 before concluding at 410. For instance, the bridging device 106 of FIG. 1 may transmit the unicast frame 104 to one or more of the non-confirmed delivery networks 110.

In this manner, an embodiment of the method 400 may route a unicast frame to one of multiple networks without using an address table. By determining if a transmission has succeeded at a confirmed delivery network, the method 400 may reduce network traffic and processing, thereby facilitating routing efficiency.

Those skilled in the art may make numerous uses and modifications of and departures from the specific apparatus and techniques disclosed herein without departing from the inventive concepts. Consequently, the disclosed embodiments should be construed as embracing each and every novel feature and novel combination of features present in or possessed by the apparatus and techniques disclosed herein and limited only by the scope of the appended claims, and equivalents thereof. Thus, the present disclosure is not intended to be limited to the embodiments shown herein, but is to be accorded the widest scope possible consistent with the principles and features as defined by the following claims.

The invention claimed is:

1. A method to reduce table lookups and network traffic when bridging networks, the method comprising:
   receiving, at a bridging device, a unicast frame to be bridged;
   transmitting the unicast frame by the bridging device without using an address table to one of a plurality of confirmed delivery networks and determining, at the bridging device, whether the unicast frame was successfully delivered;
   preventing the unicast frame from being retransmitted to another network of the plurality of confirmed delivery networks in response to determining that the unicast frame was successfully delivered to the one confirmed delivery network;
   sequentially transmitting the unicast frame to one or more other networks of the plurality of confirmed delivery networks when the bridging device determines that the unicast frame was not successfully delivered to the one confirmed delivery network; and
   transmitting the unicast frame to one of a plurality of non-confirmed delivery networks when the bridging device determines that the unicast frame was not successfully delivered to any of the confirmed delivery networks.

2. The method of claim 1, wherein determining, at the bridging device, whether the unicast frame was successfully delivered further comprises monitoring to identify a confirmed delivery signal.

3. The method of claim 1, wherein determining, at the bridging device, whether the unicast frame was successfully delivered further comprises receiving a confirmed delivery signal.

4. The method of claim 1, further comprising generating a confirmed delivery signal at the confirmed delivery network, wherein the confirmed delivery signal indicates that the unicast frame was successfully delivered to the confirmed delivery network.

5. The method of claim 1, wherein receiving the unicast frame further comprises receiving the unicast frame from a host device coupled to the bridging device.

6. The method of claim 1, further comprising determining whether the unicast frame should be routed to the confirmed delivery network.

7. An apparatus, comprising:
   a plurality of confirmed delivery networks, wherein at least one particular network of the confirmed delivery networks comprises a hypervisor having synchronous delivery confirmation;
   a plurality of non-confirmed delivery networks; and
   a bridging device configured to:
     receive a unicast frame;
     transmit the unicast frame without using an address table to at least one network of the plurality of confirmed delivery networks and determine whether the unicast frame was successfully delivered;
     prevent the unicast frame from being retransmitted to another network of the plurality of confirmed delivery networks in response to determining that the unicast frame was successfully delivered to the at least one confirmed delivery network;

sequentially transmit the unicast frame to one or more other networks of the plurality of the confirmed delivery networks when the bridging device determines that the unicast frame was not successfully delivered to the at least one confirmed delivery network; and transmit the unicast frame to one of the plurality of non-confirmed delivery networks when the bridging device determines that the unicast frame was not successfully delivered to any of the confirmed delivery networks.

8. The apparatus of claim 7, wherein the bridging device, the plurality of the confirmed delivery networks, and the plurality of the non-confirmed delivery networks are housed in a common computing device.

9. The apparatus of claim 7, wherein the bridging device is further configured to determine if the unicast frame was successfully delivered by monitoring to identify a confirmed delivery signal.

10. The apparatus of claim 7, wherein the bridging device is further configured to receive a confirmed delivery signal.

11. The apparatus of claim 7, wherein the hypervisor comprises a synchronous confirmation module configured to synchronously confirm delivery of the unicast frame.

12. The method of claim 1, wherein at least one particular network of the plurality of confirmed delivery networks comprises a hypervisor having synchronous delivery confirmation.

* * * * *